US008510476B2

(12) United States Patent
Eastvold

(10) Patent No.: US 8,510,476 B2
(45) Date of Patent: Aug. 13, 2013

(54) SECURE REMOTE DIAGNOSTIC CUSTOMER SUPPORT NETWORK

(75) Inventor: Roger Eastvold, Morgan Hill, CA (US)

(73) Assignee: Brooks Automation, Inc., Chelmsford, MA (US)

( * ) Notice: Subject to any disclaimer, the term of this patent is extended or adjusted under 35 U.S.C. 154(b) by 505 days.

(21) Appl. No.: 10/074,411

(22) Filed: Feb. 12, 2002

(65) Prior Publication Data

US 2002/0112064 A1     Aug. 15, 2002

Related U.S. Application Data

(60) Provisional application No. 60/269,084, filed on Feb. 15, 2001.

(51) Int. Cl.
*G06F 15/16* (2006.01)
*G06F 15/173* (2006.01)
*G06F 11/30* (2006.01)
*G06F 11/00* (2006.01)

(52) U.S. Cl.
USPC ........... 709/250; 709/223; 709/224; 709/225; 702/184; 702/188

(58) Field of Classification Search
USPC .............. 714/24, 47, 48; 702/188; 399/8–11, 399/38, 75, 76, 91; 358/1.15, 504; 710/15, 710/19; 700/17, 19–21, 121, 108; 438/4, 438/5, 14, 17, 18, 21, 22; 607/6, 17; 600/300, 600/547, 549
See application file for complete search history.

(56) References Cited

U.S. PATENT DOCUMENTS

| | | | |
|---|---|---|---|
| 5,550,984 A | 8/1996 | Gelb | 395/200.17 |
| 5,790,977 A | 8/1998 | Ezekiel | 702/122 |
| 5,793,763 A | 8/1998 | Mayes et al. | 370/389 |
| 5,808,907 A | 9/1998 | Shetty et al. | 365/551.02 |
| 5,847,957 A | 12/1998 | Cohen et al. | 364/468.15 |
| 6,122,565 A | 9/2000 | Wenning et al. | 700/206 |
| 6,182,226 B1 * | 1/2001 | Reid et al. | 726/15 |
| 6,219,786 B1 * | 4/2001 | Cunningham et al. | 713/152 |
| 6,314,385 B1 * | 11/2001 | Kim et al. | 702/184 |
| 6,331,776 B1 * | 12/2001 | Debbins et al. | 324/309 |
| 6,799,195 B1 * | 9/2004 | Thibault et al. | 709/203 |
| 6,879,940 B1 * | 4/2005 | Crist et al. | 702/188 |
| 6,880,089 B1 * | 4/2005 | Bommareddy et al. | 726/11 |
| 7,010,294 B1 * | 3/2006 | Pyotsia et al. | 455/420 |

(Continued)

OTHER PUBLICATIONS

Gaines, B.R., Mediator: an intelligent information system support virtual manufacturing enterprise, Oct. 22, 1995, Systems, Man d Cybernetics, vol. 1, pp. 964-969.*

(Continued)

*Primary Examiner* — Backhean Tiv
(74) *Attorney, Agent, or Firm* — Perman & Green, LLP; Colin C. Durham

(57) ABSTRACT

A system for accessing data remotely from a network. In one embodiment, the system comprises a first network interface card permitting data transfer between a local network and an intermediate network; a second network interface card permitting data transfer between intermediate network and a remote network; and a module located within the intermediate network, through which all data transferring between the first network and the third network must pass. Information transmitted by the remote network may or may not be received and acted upon by the local network depending on a set of predetermined criteria applied by the intermediate network.

33 Claims, 9 Drawing Sheets

(56) References Cited

U.S. PATENT DOCUMENTS

| | | | |
|---|---|---|---|
| 7,055,173 B1* | 5/2006 | Chaganty et al. | 726/11 |
| 7,188,142 B2* | 3/2007 | Chi et al. | 709/206 |
| 7,606,191 B1* | 10/2009 | Breau et al. | 370/328 |
| 2005/0221514 A1* | 10/2005 | Pasadyn et al. | 438/14 |
| 2010/0118845 A1* | 5/2010 | Solver | 370/338 |

OTHER PUBLICATIONS

International Search Report Application No. PCT/US02/04907.

* cited by examiner

SECURE REMOTE DIAGNOSTIC CUSTOMER SUPPORT NETWORK

CROSS REFERENCE TO RELATED APPLICATION

This application claims the benefit of copending U.S. Provisional Application Ser. No. 60/269,084, filed on Feb. 15, 2001.

BACKGROUND OF THE INVENTION

1. Field of the Invention

The present invention relates to the field of computer networking, and more particularly to a system and method for operating and maintaining equipment at a remote location using the Internet without placing ultimate control over the equipment in the hands of the remote user.

2. Brief Description of Related Developments

The fabrication of today's semiconductors requires complex tools for processing various stages of the wafer and inspecting the wafer at each stage or layer. During wafer processing, if the production equipment varies outside of desired control limits, the equipment can be subjected to defects that produce defective devices and a loss of yield. Because of the high cost associated with these problems, many types of defect inspection instruments are employed to screen the inspection devices and locate potential problems early in the process. These defect inspection systems enable early correction of potential problems. Defect inspection tools are themselves very sophisticated systems which measure, model and compare the results of inspections performed at each production step. These inspection systems also can develop problems, which impact their ability to monitor production and accurately detect and characterize defects.

In the last two decades, the semiconductor fabrication industry has developed systems for monitoring complex capital equipment to assure proper performance. Similar systems have been employed in the medical imaging industry where the quality of performance of the equipment has a direct impact on the ability of a radiologist, for example, to detect and diagnose pathology. As in any other type of imaging system, the overall performance is the result of many variables difficult to quantify from merely observing the end result. Manually measuring these variables (or critical performance parameters) requires a significant expenditure of time, which precludes frequent evaluation and correction or centralized (off site) calibration. The time required to perform these evaluations also impacts the overall productivity and effectiveness of the imaging system.

To solve the problem of continually manually monitoring the performance of the system while having the smallest impact possible on the productivity of the system, manufacturers have developed automated external monitors having the ability to periodically and regularly sample various relevant parameters. These equipment monitors sample various sources of information: data from sensors within the equipment, results of automated quality assurance tests, detailed diagnostic information, and reliability and utilization information gathered from equipment logs. The equipment monitors and/or associated equipment analyze this information and the status of the device is evaluated, reports developed, and any significant deviation from normal automatically reported to the service provider and the customer. Notification to the service provider automatically opens a service case and initiates a series of follow-up actions to initially investigate the report, evaluate the data, diagnose the cause, and correct the problem or contact the customer to schedule a time to effect the repair.

The character of the semiconductor industry is such that competition requires that products be designed, manufactured, and marketed in the most efficient and cost effective manner possible. To achieve this end, improvements in fabrication technology have had to keep pace with the rapid improvements in the electronics industry. As such, the performance of machines in fabrication facilities must be regularly monitored to ensure that they operate as efficiently as possible.

As used herein, the term "customer" refers to a purchaser and/or user of an inspection tool or inspection tool monitoring device. A customer employs the inspection tool or inspection tool monitoring device to evaluate the quality of a semiconductor device, and may sell, integrate, or otherwise pass along the semiconductor device. An "inspection tool" or "production equipment" refers to the device used to inspect the semiconductor device, while an "inspection tool monitoring device" or "defect inspection instrument" refers to a device used to evaluate certain parameters or the performance of an inspection tool.

The standard approach to diagnosing equipment problems involves servicing equipment only when a problem is reported by a customer. When such a problem is reported, a service engineer is typically sent to the customer site and, after arriving at the site, collects inspection tool and/or inspection tool monitoring device data in an attempt to diagnose the problem. This approach results in significant equipment downtime and requires a great deal of time, effort, and cost associated with the service engineer.

This conventional, highly subjective method of manually evaluating and calibrating equipment results in greatly varied results. For example, results and down times can vary widely from one service engineer to another, and can produce a significantly increased repair time. Moreover, the standard approach of servicing a piece of equipment only when a problem is reported by a customer results in increased downtimes and lost revenue for both the customer and the service organization.

As may be appreciated, use of an automated device to monitor performance of inspection tools and inspection tool monitoring devices may subject the tool data, settings, or other related information to capture by third parties. Data networks trafficking in this sensitive data, such as the internet, may employ commonly available encryption methods such as SSL and firewalls, but customers in the rapidly changing semiconductor fabrication industry tend to be extremely reticent to expose data to such data networks unless a scheme can be devised that offers an exceedingly high level of security.

SUMMARY OF THE INVENTION

The present invention is directed in one aspect to a system for accessing data remotely from a network. In one embodiment, the system comprises a first network interface card permitting data transfer between a local network and an intermediate network; a second network interface card permitting data transfer between intermediate network and a remote network; and a module located within the intermediate network, through which all data transferring between the first network and the third network must pass. Information transmitted by the remote network may or may not be received and acted upon by the local network depending on a set of predetermined criteria applied by the intermediate network.

In another aspect, the present invention is directed to a system for accessing a local network from a remote network through an intermediate network. In one embodiment the system comprises a first network interface card permitting data transfer between the local network and the intermediate network; a second network interface card permitting data transfer between the remote network and the intermediate network; a module located within the intermediate network, through which all data transferring between the local network and the remote network must pass; and an equipment diagnostic monitor system located within the intermediate network, wherein the equipment diagnostic monitor system monitors tests performed on at least one item residing within the local network.

In a further aspect, the present invention is directed to a data system. In one embodiment the data network comprises a first network interface device enabling data transfer between a local network and an intermediate network; a second network interface device enabling data transfer between a remote network and the intermediate network; and an equipment diagnostic monitor system located within the intermediate network, wherein the equipment diagnostic monitor system monitors tests performed on at least one item in the local network.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(S)

Figure 1:
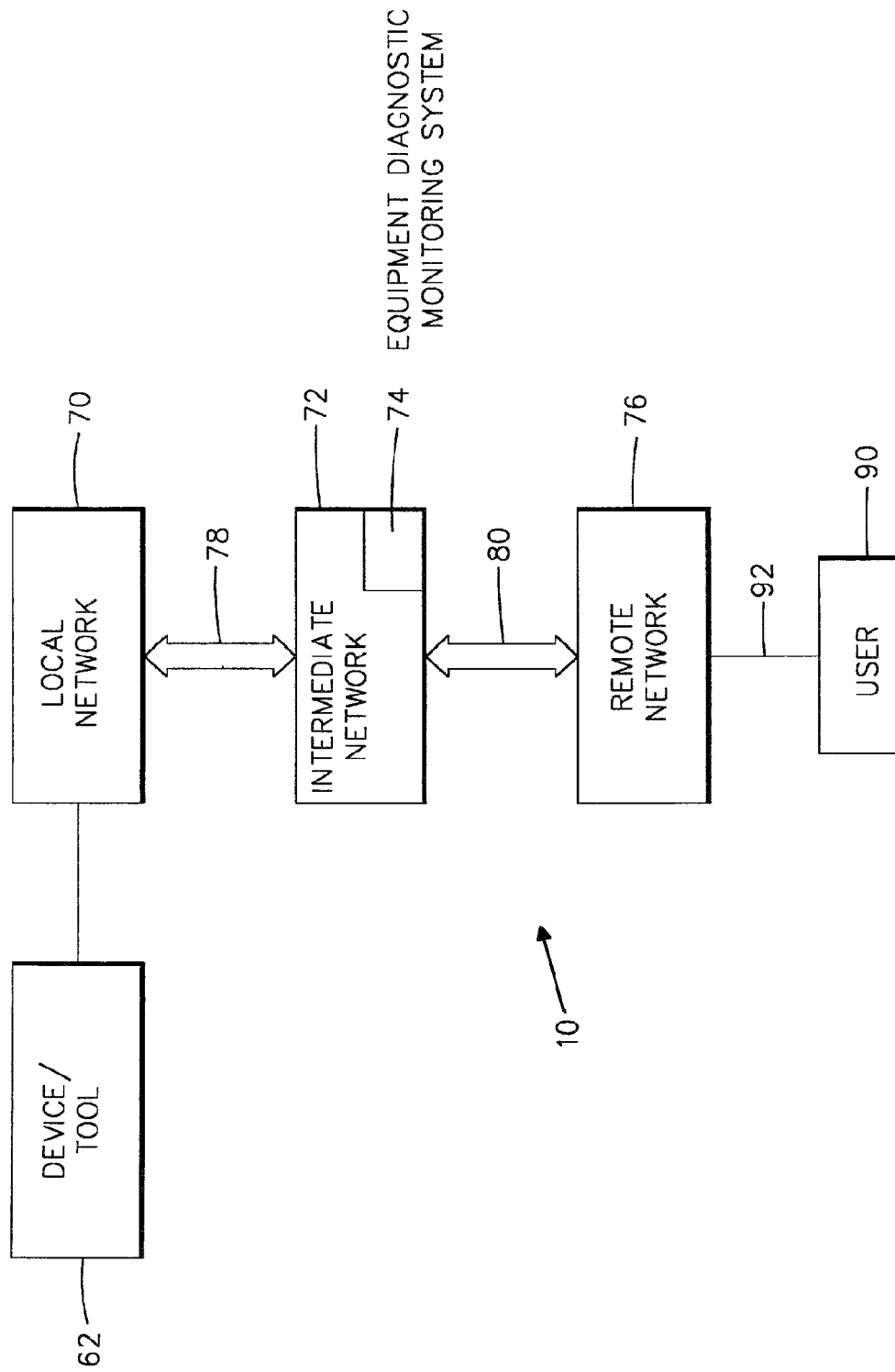
FIG. 1 is a block diagram of one embodiment of a system incorporating features of the present invention.

Referring to FIG. 1, there is shown an exploded perspective view of a system 10 incorporating features of the present invention. Although the present invention will be described with reference to the embodiment shown in the drawings, it should be understood that the present invention can be embodied in many alternate forms of embodiments. In addition, any suitable size, shape or type of elements or materials could be used.

Referring to FIG. 1, the present invention generally comprises a system 10 for providing remote access to one or more device 62, also referred to herein as a tool. In one embodiment, the tool 62 comprises a semiconductor manufacturing or inspection tool. The system 10 generally comprises a local network 70 having access to the tool 62, an intermediate network 72 including an equipment diagnostic monitoring system 74, and remote network 76 that provides a user remote access to the tool 62. In alternate embodiments, the system 10 can include such other suitable components or networks to allow the diagnosis or analysis of the tool 62 from a remote facility. It is a feature of the present invention to provide a system that allows a user to access a tool from a remote facility in a secure manner so that all communications related to the tool are not able to be intercepted by unauthorized parties.

As shown in FIG. 1, the local or first network 70 is adapted to communicate to the intermediate or second network 72 over a communication interface or channel 78. In one embodiment the communication interface 78 comprises a network interface card. In alternate embodiments, the first and second networks 70, 72 can communicate via any suitable communication system, network or device. The second network 72 and remote network 76 are adapted to communicate with each other via a second communication interface 80. In one embodiment, the second communication interface or channel 80 comprises a second network interface card.

The intermediate network 72 is generally adapted to allow users 90, via the remote network 76, to access the tool, correct problems with the tool and alert concerned personnel based on the desires or needs of the tool 70 and tool owner.

The remote network 76 is generally adapted to allow a user 90 to access the remote network 76 over a communication network, such as for example the Internet (world wide web).

As shown in FIG. 1, the second or intermediate network 72 includes an equipment diagnostic monitoring system 74, also referred to herein as "equipment diagnostic monitor" that is generally adapted to monitor and analyze the tool 62. The equipment diagnostic monitoring system 74 can also be adapted to provide alerts based on the tool status. The system 10 allows a remote user to request information about a tool 62, and provide suggested input to the tool 62. This input can include for example, calibration values, tool data or other information. The requests or commands can be accepted or rejected by the system 10 based on a predetermined set of criteria maintained by the dual network interface card arrangement and the intermediate network 72, including the equipment diagnostic monitoring system 74.

Figure 2:
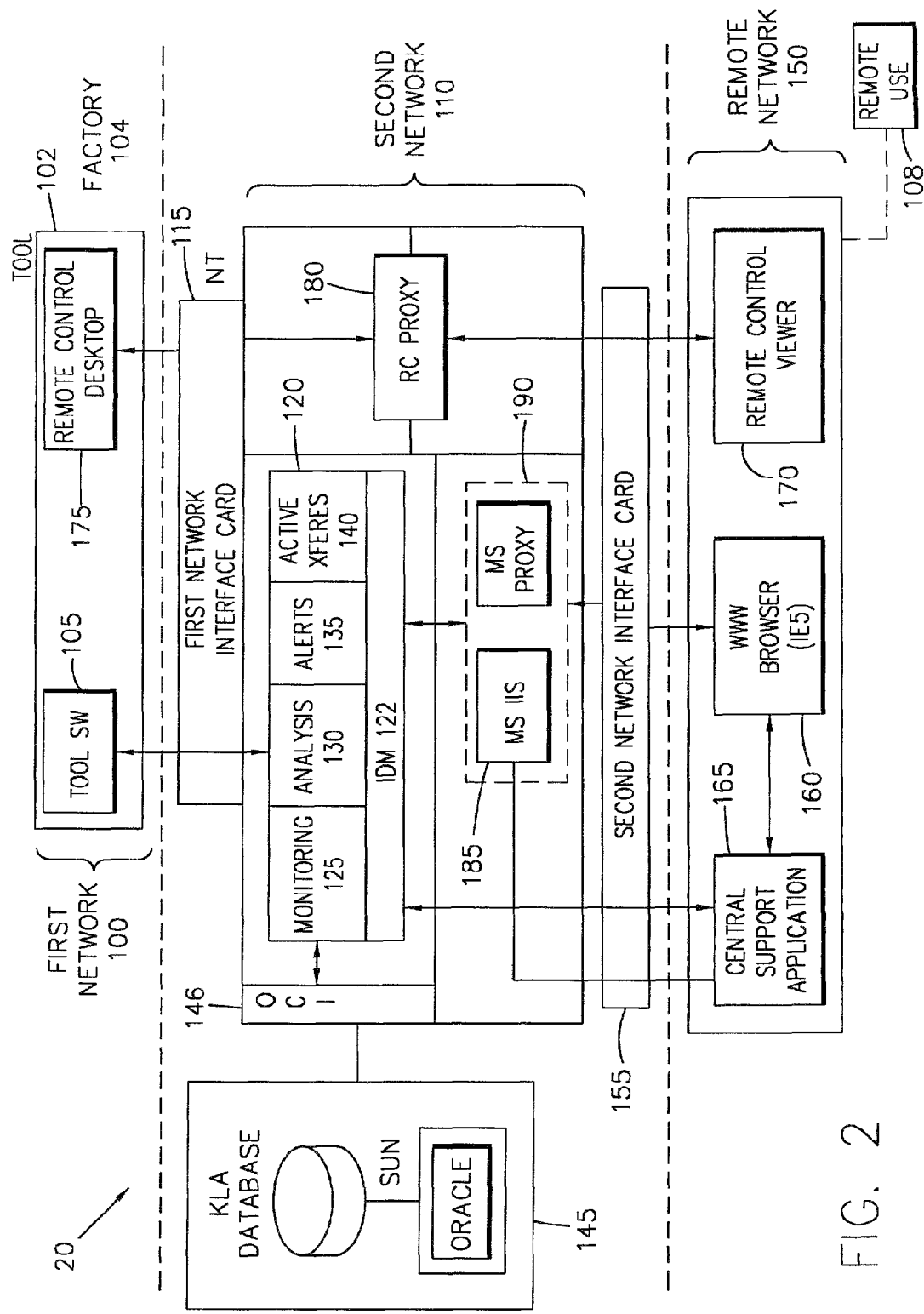
FIG. 2 illustrates the functional interface between a first remote network containing tool monitoring equipment, a second intermediate network containing an equipment diagnostic monitor system, and a third remote network containing remote control equipment according to an embodiment of the present invention.

FIG. 2 illustrates one embodiment of a system 10 incorporating features of the present invention. As shown in FIG. 2, the system 10 can generally comprise a first network 100 containing tool monitoring equipment 105, 175, a second network 110 containing an equipment diagnostic monitor system 120, and a remote network 150 containing remote control equipment. The first network 100 could be located for example at a fabrication factory 104 at a customer's site where semiconductor wafers or chips, for example, are manufactured. As used herein, the term "customer" refers to a purchaser and/or user of an inspection tool 102 or inspection tool monitoring device. Tooling software 105 runs on the first network 100. The tooling software 105 is generally adapted to perform tests such as diagnostic or performance tests, on the tool 102. These tests are run to evaluate the tool's performance and can be used to determine whether the tool 102 is functioning properly or should be recalibrated, for example. The first network 100 may communicate with a second network 110 via a first network interface card (NIC #1) 115. After a test is run, the performance data is transmitted to the test to the equipment diagnostic monitor system ("iDM") 120 for evaluation and storage.

The equipment diagnostic monitor system 120, which is shown located in the second network 110, has numerous functions, including controlling the tests performed by the tool software 105, saving data from the tooling tests, analyzing data from the tests, and sending out alerts to concerned personnel when errors with the tool 102 on tool performance are discovered. The equipment diagnostic monitor system 120 architecture generally employs various operative and functional modules. The constituent equipment diagnostic monitor system 120 modules can include a monitoring submodule 125, an analysis submodule 130, an alerts submodule 135 and an active transfers (active Xfers) submodule 140. In alternate embodiments, the equipment diagnostic monitor system 120 can include such other suitable devices or components for remote monitoring and analysis of a semiconductor manufacturing tool. It is a feature of the present invention to diagnosis and analyze the performance of a semiconductor manufacturing tool from a remote facility.

The equipment diagnostic monitor system 120 oversees the tooling tests and controls the flow of data to and from the tool 102. While a test is being run by the tool software 105, the data from that particular test is generally not accessible to the equipment diagnostic monitor system 120. However, after a test is completed, the data can be accessed by the equipment diagnostic monitor system 120, which receives the data and analyzes it in the analysis submodule 130. The equipment diagnostic monitor system 120 then sends the data via an OCI 146 to a database 145. During the analysis, if any irregularities with the tool 102 or any predetermined thresholds or other criteria are detected, an alert may be sent to a remote user via the remote network 150. This alert is sent by the alerts submodule 135 and may be in any suitable form, such as for example, a fax, page, email, or any other form of communication to appropriate personnel or locations. After the tool software 105 performs a test, the test data is sent to the equipment diagnostic monitor system 120, which, after analyzing the data, passes the test data into the database 145. The database 145 can comprise any suitable medium for the storage of data, such as for example, an Oracle™ or KLA™ database.

The equipment diagnostic monitor system 120 may be comprised of general computing hardware such as for example, a Pentium 200 MHz (with 64 MB RAM, 3.2 GB Hard disk drive (HDD)) or above computer system; two standard 10/100 Ethernet adapters; and Fax/modem cards (for paging and faxing). In alternate embodiments, any suitable computing hardware arrangements capable of providing the functionality described herein are also acceptable. In one embodiment, examples of the software of the equipment diagnostic monitor system 120 can include Windows NT™ Server 4.0 and above; Microsoft Internet Information Server (Web Server); Microsoft MS Access (database); Microsoft Proxy Server; Allaire ColdFusion; and certain applicable third party tools/SDK (e.g., faxing, paging, image analysis, statistical analysis, expert system, etc.). In alternate embodiments, any suitable software or systems that are capable of providing the functionality of the various embodiments of the present invention described herein can be used or incorporated.

The second network 110, in which the equipment diagnostic monitor system 120 generally resides, is accessible from a remote network 150 through a second network interface card (NIC #2) 155. The second network 110 is accessible through the second network interface card 155 from a Central Support Application 165. In one embodiment this can include for example, a java applet running when the IP address for the second network 110 is accessed via a network browser 160 such as for example, a World Wide Web (WWW) browser. When a user at the remote location 108 has the proper passwords and authorizations, he may indirectly access a remote control desktop 175 at a tool 102 located on the first network 100 from a remote control viewer 170. However, the user cannot directly access the tool 102 from the remote control viewer 170 because the user must go through the second network 110. A remote control (RC) proxy server 180 can lie between the remote control viewer 170 on the remote network 150 and the remote control desktop 175 on the first network 100. The RC proxy 180 is generally adapted to prevent direct IP routing and hides the IP address of the remote control desktop from a user on the remote network 150. In alternate embodiments any suitable device can be used to connect the remote control viewer 170 to the remote control desktop 175. It is a feature of the present invention to allow a user to access a tool from a remote network through a separate network to prevent direct IP routing to the tool and keep communications secure. The RC proxy 180 generally comprises a device or software that prevents direct IP routing for security purposes.

Also located on the second network is a MS IIS 185, which generally comprises a Microsoft web server operating on for example, a Microsoft NT machine and enabling communication with the remote network 150. A MS proxy 190 can also be included in the system 10 that is generally adapted to provide an interface proxy between the remote network 150 and the equipment diagnostic monitor system 120, with the MS proxy 190 located on the second network.

Figure 3:
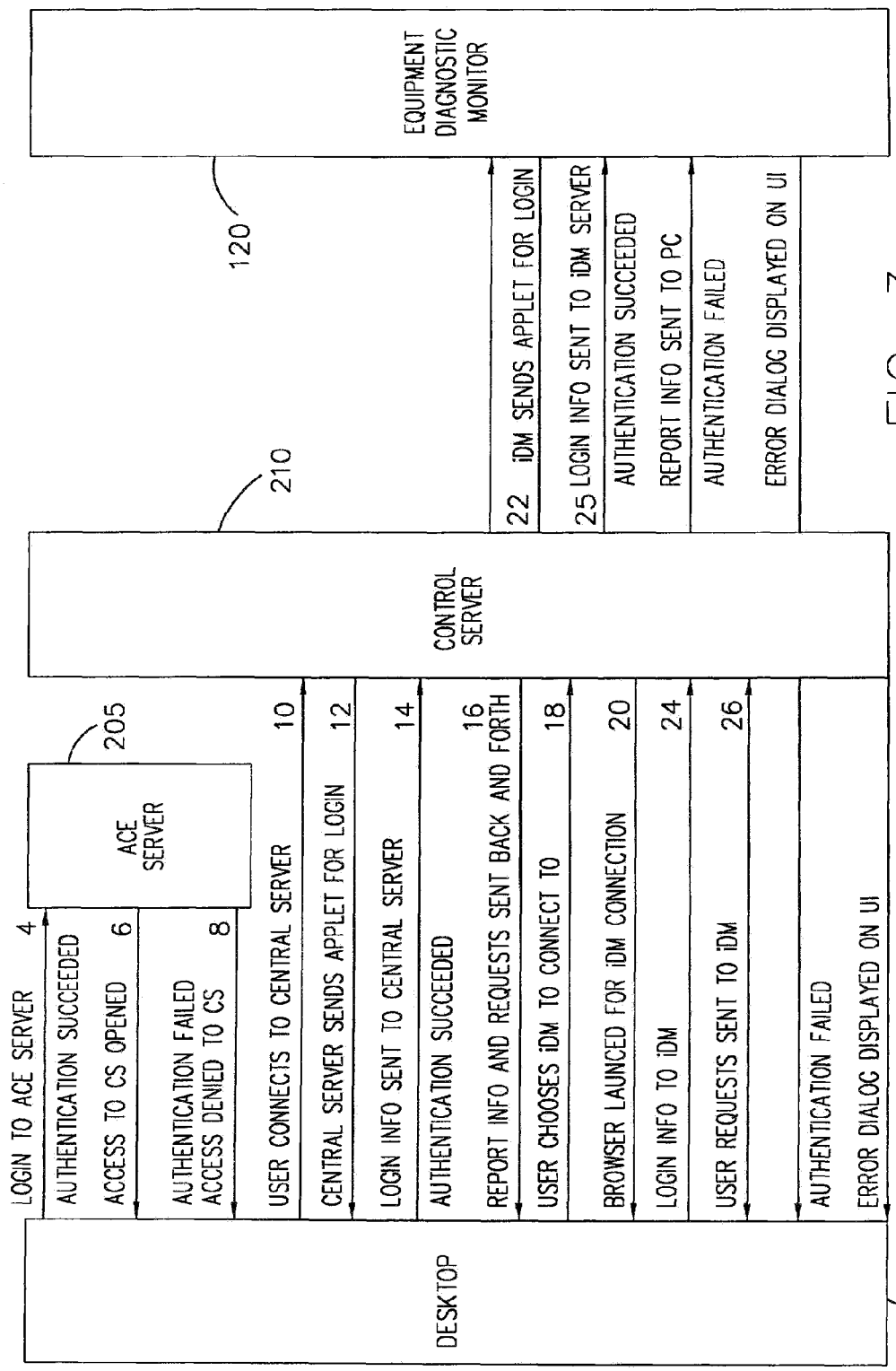
FIG. 3 illustrates the login process by a user on a remote network into a central server and an equipment diagnostic monitor system on the second network according to an embodiment of the present invention.

FIG. 3 illustrates one embodiment of a login process according to features of the present invention. Referring to FIGS. 2 and 3, in order for a user on a desktop 200 at the remote network 150 to access the equipment diagnostic monitor system 120, the user must first login to an ACE™ server 205. If the user has the correct ACE™ token card, login and password, the user may log 4 into the ACE server 205 and then access 6 a central server 210. Multiple equipment diagnostic monitoring systems 120 are accessible through the central server 210. If the user does not have the correct token card or password, the login fails 8. On a successful login to the ace server 205, the user connects 10 to the central server 210 and an applet is sent 12 from the central server to the desktop 200 located on the remote network 150. After a user on the desktop 200 types in a login and password, this information is sent 14 to the central server 210. Upon a successful login, the user may select 18 a specific equipment diagnostic monitor system 120 to access. After the user has selected an equipment diagnostic monitor system 120, a browser program is launched 20 on the desktop 200. The equipment diagnostic monitor system 120 then sends 22 an applet to the desktop 200 for login. After the user enters this login information, the equipment diagnostic monitor system 120 processes 24 the login. If successful, the user at the desktop 200 may make requests 26 for data from particular tools 102.

Figure 4:
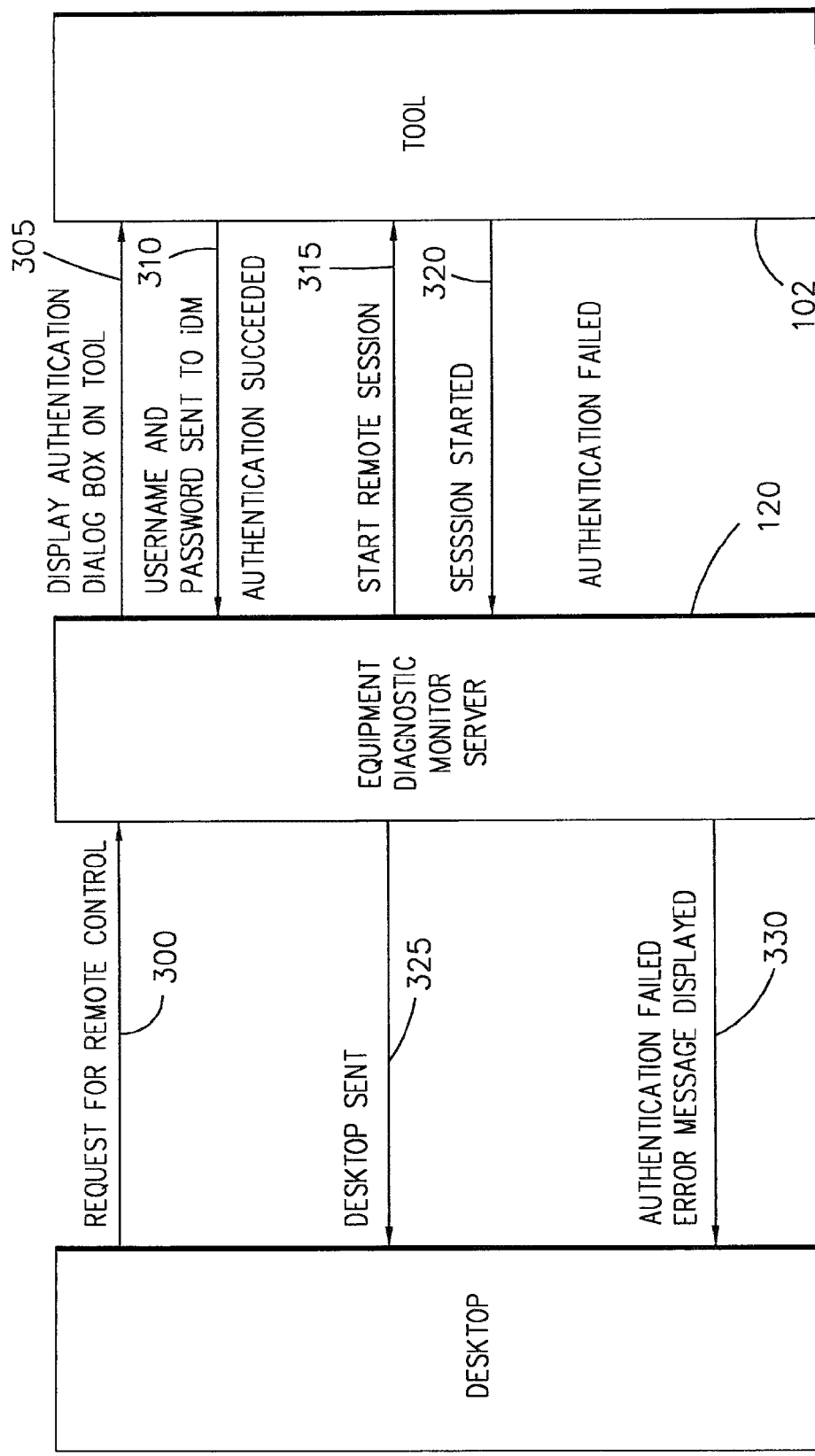
FIG. 4 illustrates the processing that occurs where a user on the remote network successfully logs into the equipment diagnostic monitor server according to an embodiment of the present invention.

FIG. 4 illustrates the processing that occurs where a user at the desktop 200 successfully logs into the equipment diagnostic monitor system server 122 according to an embodiment of the present invention. After successfully logging in to the equipment diagnostic monitor system 120, the user may access the tool 102. A request 300 for remote control is first sent to the equipment diagnostic monitor system 120. Next, an authentication dialog box can be displayed 305 on the tool 102. Then, the username and password are sent 310 from the tool 102 to the equipment diagnostic monitor system 120. Upon a successful authentication, a command 315 is sent to the tool 102 from the equipment diagnostic monitor system 120 instructing the tool 102 to begin a remote session. The remote session is started 320 at the tool 102. Only one port in the specified range is generally used for communication at any time. When a remote session is authenticated, a message is sent 325 to the desktop 200 to inform the user of this occurrence. If the authentication fails, an error message is sent 330 to the desktop 200 where it is displayed.

Requests from a user are generally classified as passive or active. A passive request does not interact with the host tool 102 in any way. However, an active request initiates some action on the host tool 102. Passive requests are used for either configuring the site or for analyzing the data present in the local database 145 shown in FIG. 2. Passive requests run with more security privileges than active ones. User access to the request is determined by static privileges and dynamic privileges. These privileges are stored in the database 145 and are accessible by the equipment diagnostic monitor system 120. The customer determines these static components when the equipment diagnostic monitor system 120 software is installed. For example, a customer may limit access to and the ability to alter tool settings solely to company technicians. This static component determination involves examining the appropriate registry entries. The dynamic privilege depends upon the host status at the time of the request. For example, when the network traffic crosses a preset threshold, only passive requests may be allowed. In other words, dynamic privileges are system dependent and may be granted in certain circumstances and denied in others, again as determined at least in part by the customer.

Passive requests are allowed even when the host tool 102 is in critical operation. To submit an active request, a user must have active request privileges and be logged in to the equipment diagnostic monitor system 120 to which the tool 102 he wants to analyze is connected. If the user has access to the correct equipment diagnostic monitor system 120, the next step is to verify whether the tool 102 is controlled by the equipment diagnostic monitor system 120 in question, and whether the user has privileges to access that particular tool 102. If the user has access to that tool 102, he may request that an active test be run. The remote user may also submit a recalibration suggestion to an operator of the tool 102.

Each tool 102 can have a display on which a suggestion sent from a remote user can be displayed. For example, where a technical engineer decides that a tool 102 should be recalibrated, he may send a recalibration message to the tool 102. Where the user has the privilege of sending a suggestion to the display on the tool 102, the suggestion is displayed. An operator of the tool 102 may choose whether to follow or disregard such a suggestion. This setup prevents a remote user from changing the settings on a tool at an inopportune time, or changing settings without anyone knowing about it.

Figure 5:
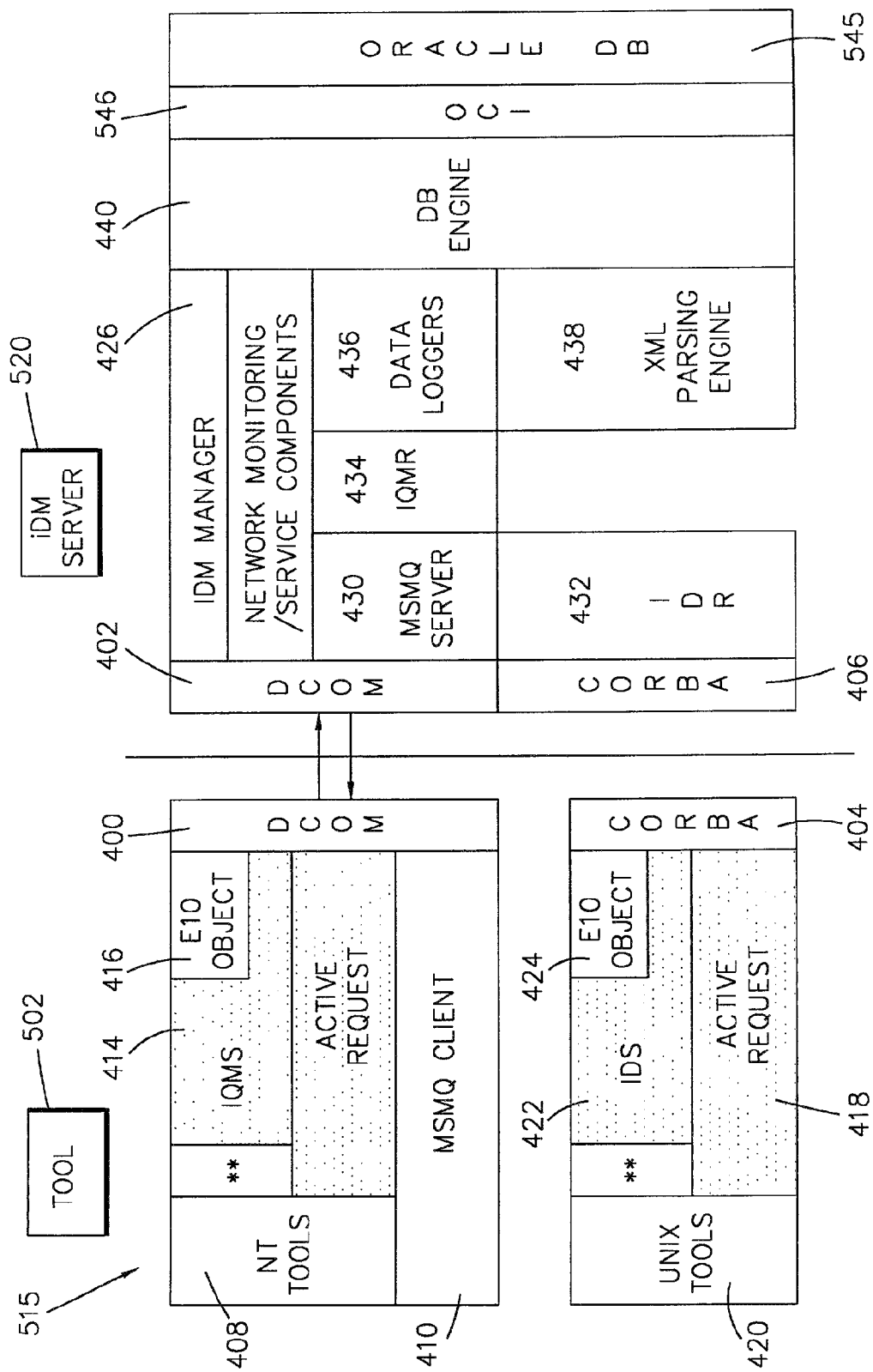
FIG. 5 illustrates the current tool server architecture according to an embodiment of the present invention.

FIG. 5 illustrates the tool server architecture according to an embodiment of the present invention. The tool 502 and the equipment diagnostic monitor system 520 communicate via a number of interfaces on the first network interface card 515. The tool 502 may communicate through a DCOM interface 400 with a DCOM interface 402 at the equipment diagnostic monitor system 520. Alternatively, the tool 502 may communicate through a CORBA interface 404 with a CORBA interface 406 at the equipment diagnostic monitor system 120. In alternate embodiment the tool 502 and equipment diagnostic monitor system 520 can communicate through any suitable architecture or communication interface. A number of modules may operate at the tool 502 at a time. In the DCOM 400 architecture, the modules may include an NT Tools module 408, a Microsoft Message Queue (MSMQ) Client 410, an Active Request module 412, an equipment diagnostic monitor system query message sender (IQMS) module 414, and an E10 Object 416. This architecture runs under the Windows NT™ platform. The active request module 412 has the function of receiving an active request from a user. When a remote user submits an active request, the active request module has the function of following the request. The IQMS 414 has the function of sending the resultant data from the active request to the equipment diagnostic monitor server 120.

Referring to FIG. 5, in the CORBA interface 404, 406, the modules at the tool 502 may include modules such as an active request module 418, a UNIX tools module 420, an equipment diagnostic monitor system data sender module 422, and an E10 Object module 424. This architecture can run under the UNIX operating system. The equipment diagnostic monitor system data sender (IDS) module 422 sends data from tests to the equipment diagnostic monitor system 120. The active request module 418 has the function of receiving an active request from a user. When a remote user submits an active request, the active request module has the function of following the request.

A number of modules also are located within the equipment diagnostic monitor system 520. For the DCOM interface 402 side of the equipment diagnostic monitor system 520, there are several modules. There is an equipment diagnostic monitor system manager module 426 which has the function of managing the operation of the equipment diagnostic monitor system 520. A network monitoring/service components module 428 monitors the network in which the equipment diagnostic monitor system 520 resides. The MSMQ server 430 receives and queues messages sent from the tool 502. Further, there is an equipment diagnostic monitor system query message receiver (IQMR) 434, which has the function of receiving data sent from the IQMS 414. A data logging module 436 provides data logging capability and is also on the DCOM 402 side of the equipment diagnostic monitor system 520 server.

The CORBA interface 406 side of the equipment diagnostic monitor system 520 also includes certain components. An equipment diagnostic monitor system data receiver (IDR) module 432 receives data from the IDS module 422. An XML parsing engine 438 converts the raw data from tests at the tool into data which can be analyzed by the equipment diagnostic monitor system 520.

As shown in FIG. 4, the modules running under both the DCOM interface 402 and those under the CORBA interface 406 both interact with other modules in the equipment diagnostic monitor system 520. These other modules include a database (DB) engine 440, with has the function of managing the flow of information between the equipment diagnostic monitor system 520 and the database 545 located external to the equipment diagnostic monitor system 520. The database 545 communicates with the database engine 440 through an OCI module 546.

Figure 6:
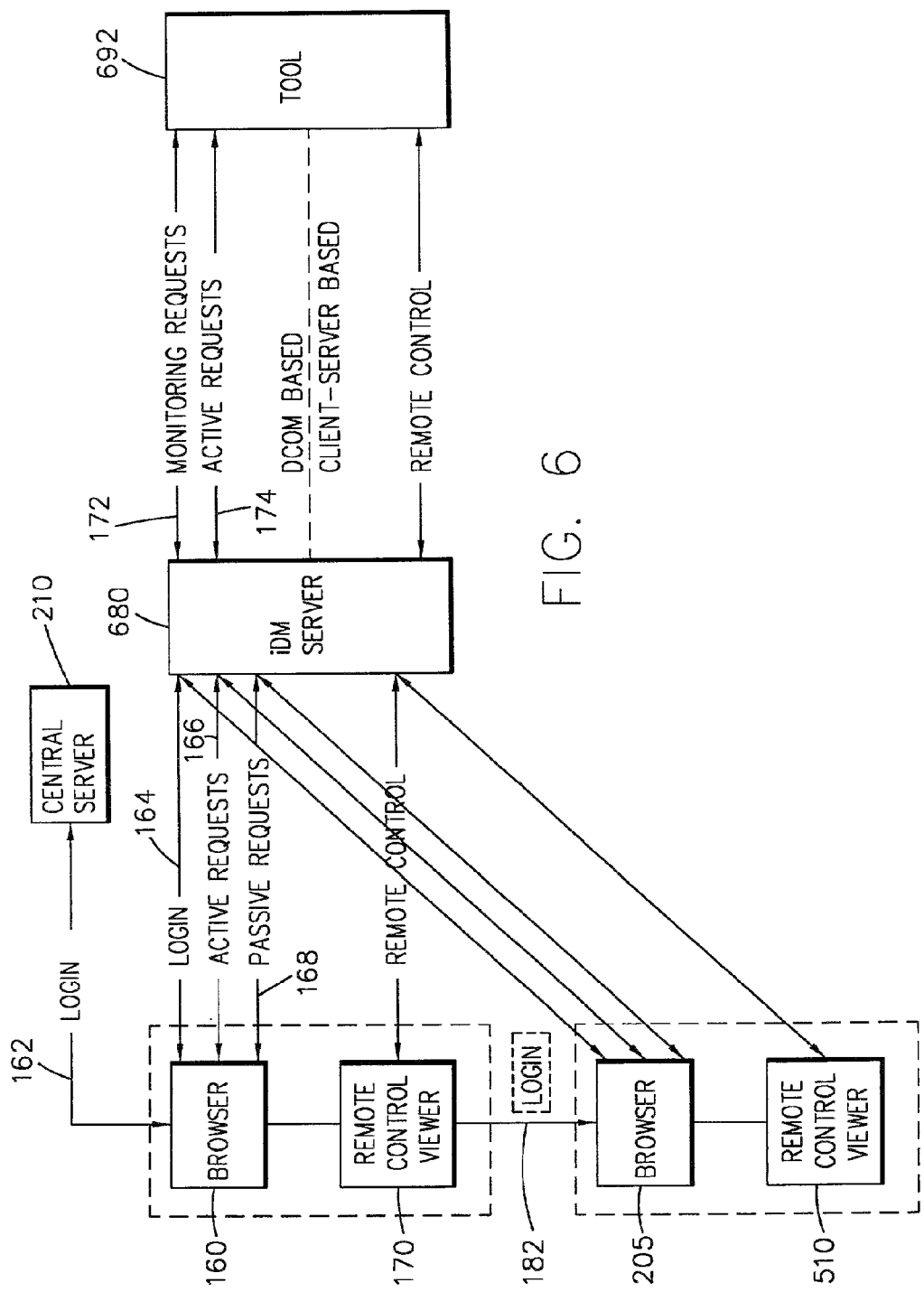
FIG. 6 illustrates a general overview of the equipment diagnostic monitor system function interface, specifically highlighting the remote control viewing process according to an embodiment of the present invention.

FIG. 6 illustrates a general overview of an equipment diagnostic monitor system 680 function interface, specifically highlighting the remote control viewing process according to an embodiment of the present invention. As shown in FIG. 6, a user at a web browser 160 may log 162 into the central server 210. If the user supplies a correct login and password, the user may be connected to the Central server 210 and may have access to any of a number of equipment diagnostic monitor's system 680 managed by the central server 210. To access an equipment diagnostic monitor system 680, the user must know the name of the equipment diagnostic monitor system 680 and enter it. Then, the central server 210 allows the user to access the requested equipment diagnostic monitor system 680. At the selected equipment diagnostic monitor system 680, the user must supply 164 a correct login and password. Once logged in, the user may enter active 166 or passive 166 requests. These requests are allowed only if the user has the requisite privileges. In other words, the user must have the authorization to make such requests. Once logged in, the user's privileges may be uploaded from a file stored in a database such as database 145 of FIG. 7. The user may also request 182 a remote viewing session. A remote viewing request is only allowed if the user has a remote viewing privilege. If the user has the correct privileges, he may make monitoring requests 172 and active requests 174 of data from the tool 692, and may also send messages with suggestions to a user at the tool 692. The user at the tool 692 may choose to either follow or disregard the suggestions.

Figure 7:
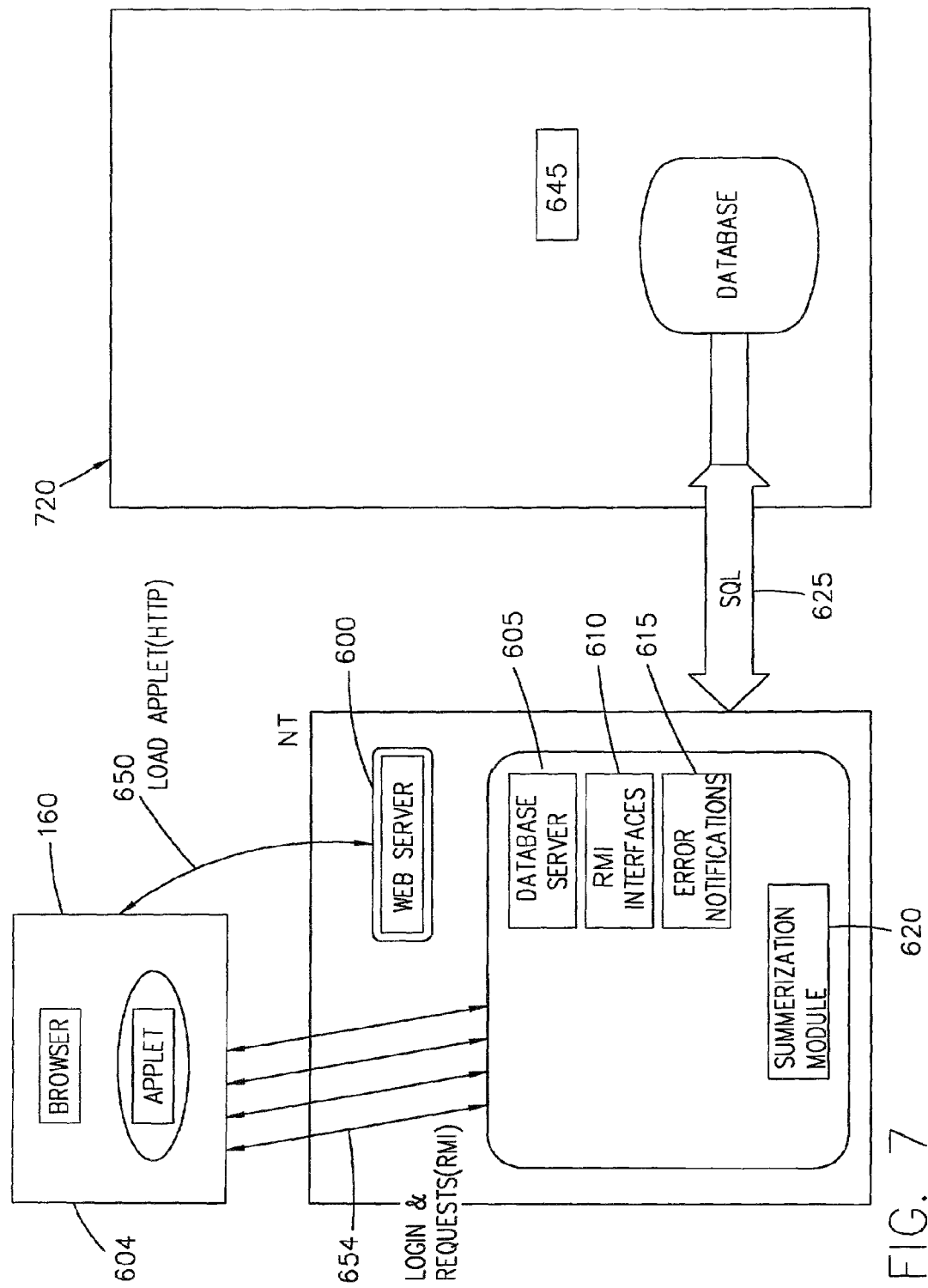
FIG. 7 illustrates the equipment diagnostic monitor system client architecture, and illustrates how a remote user can access the database according to an embodiment of the present invention.

FIG. 7 illustrates the equipment diagnostic monitor system 720 client architecture, and illustrates how a remote user may access the database 645 according to an embodiment of the present invention. First, the user must access the web server 600 at the equipment diagnostic monitor system 720 from an Internet web browser 160. Although this embodiment of the present invention is described in terms of the web, it should be understood that the features of the present invention can be embodied in any suitable communication network. The web server 600 may run for example, under the Windows NT operating system. The web server 600 sends 650 an applet 604 to the browser 160. With the applet 604, the user may access the database (DB) server 605. The DB server 605 has the function of accessing data from the database and providing it to the user as requested. The user must log in 654 to the DB server 605. Once logged in, the user may make requests through the RMI Interfaces 610. The RMI Interfaces 610 are provide for interfacing between the user and the DB server 605, particularly the login requests made by the user. The requests may be active or passive. The DB server 605 may also sent out notifications 615 when errors are detected. Finally, the DB server 605 has a summarization module 620, which analyzes data collected from the tool 672.

The DB server 605 communicates with a database 645, such as for example, the Oracle™ database 645 using structured query language (SQL) 625. The database 645 operates in UNIX and has a function of storing user privileges and all data from tests performed on the tool 672.

The monitoring process can be divided into three categories: (1) performance monitoring, (2) reliability monitoring, and (3) physical parameter monitoring. Performance monitoring deals with viewing of images, and acquiring and analyzing performance data.

Reliability monitoring includes acquiring and analyzing the various logs available on a system. For example, in order to view any of the error log tables, a request is made. If the request is authenticated, the user can view that particular error log table. The error log table presents errors for a particular tool, such as computational errors, calibration errors, general system faults, and so forth. The data is shown in the form of a table, histograms and profile charts. Physical parameter monitoring includes evaluating the physical parameters for various system hosts.

Figure 8:
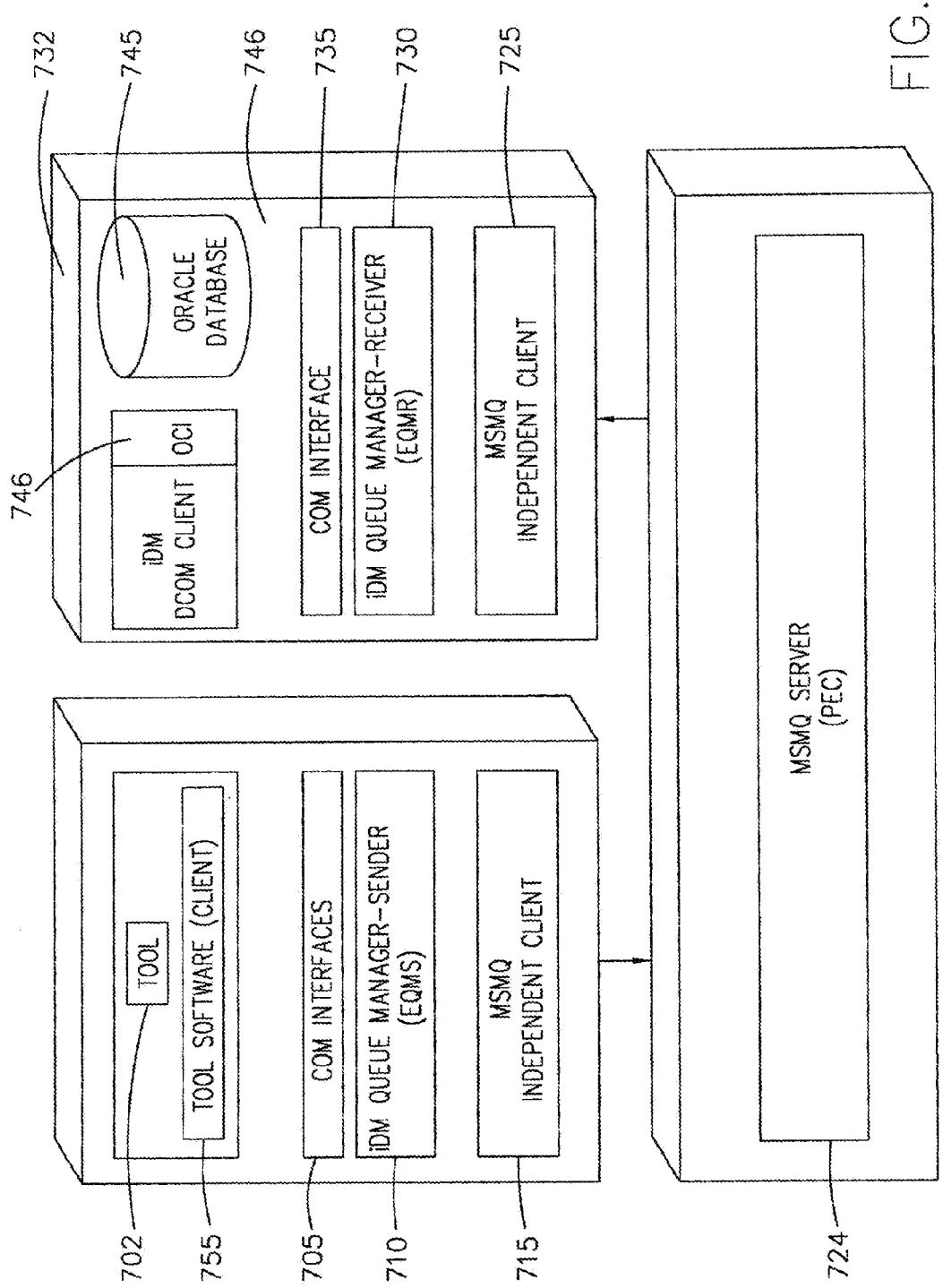
FIG. 8 shows the architecture of the equipment diagnostic monitor's system Queue Manager (QMGR) according to an embodiment of the present invention.

FIG. 8 shows the architecture of the equipment diagnostic monitor's system Queue Manager (QMGR) according to an embodiment of the present invention. The tool software 755, which runs at the tool 702, communicates with the equipment diagnostic monitor's system Queue Manager Sender (EQMS) module 710 via COM interfaces 705. The EQMS 710 sends a message via a Microsoft Message Queue (MSMQ) 715 to a message repository, such as a MSMQ server 724. The message repository may be part of the Windows NT system or a part of the equipment diagnostic monitor system 732.

The MSMQ server 724 may send a message to a MSMQ 725 located at the equipment diagnostic monitor's system 120 network. The MSMQ 725 may send a message to the equipment diagnostic monitor's system queue manager receiver (EQMR) 730. The EQMR 730 has the function of receiving queued messages from the MSMQ 725. The EQMR 730 may communicate via a COM interface 735 with the equipment diagnostic monitor system 120 DCOM client. The equipment diagnostic monitor system 732 may communicate with an Oracle™ database 745 via the OCI 146.

Figure 9:
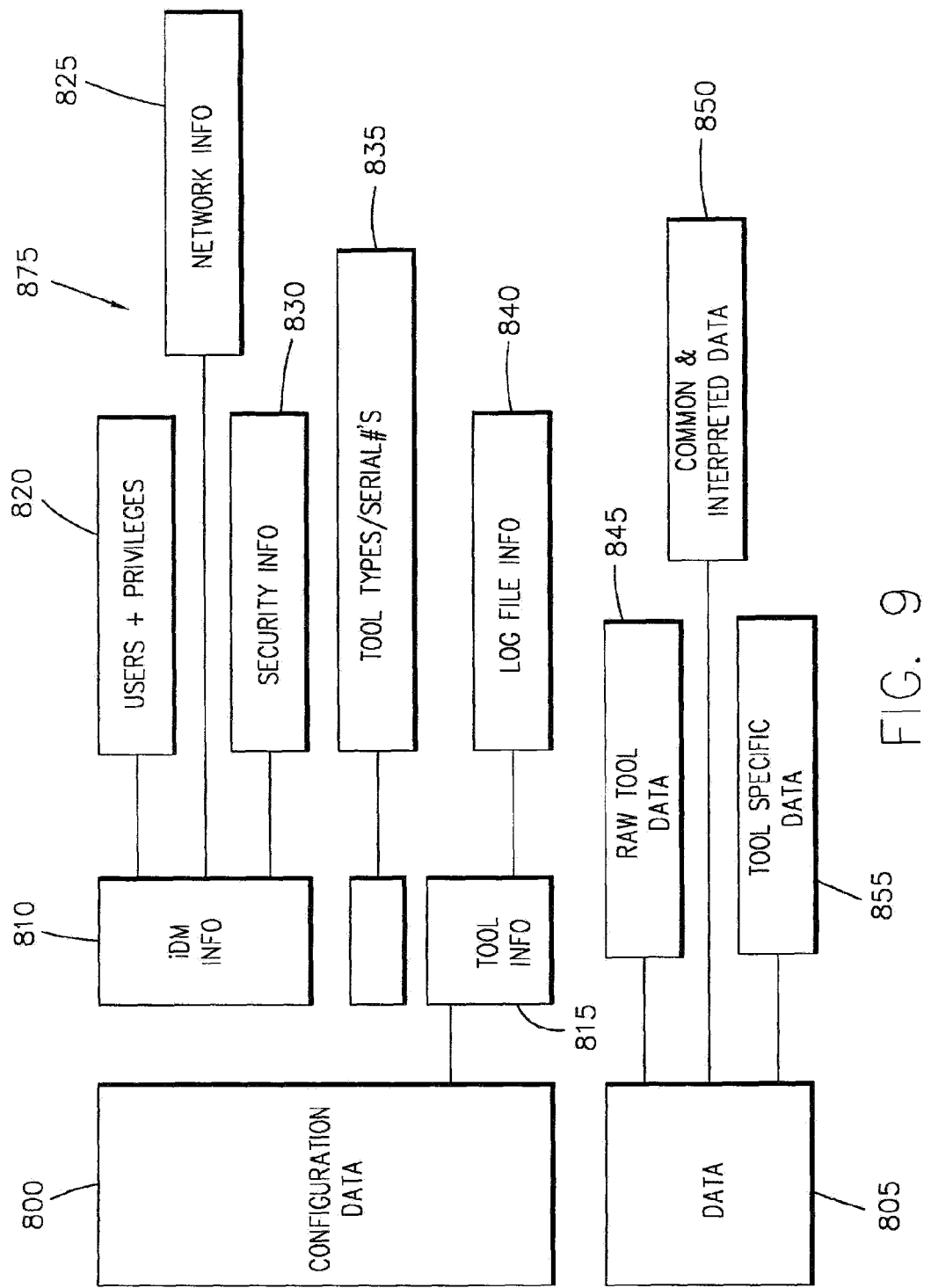
FIG. 9 shows the layout of the equipment diagnostic monitor system database according to an embodiment of the present invention.

FIG. 9 shows the layout of the equipment diagnostic monitor system database 875 according to an embodiment of the present invention. Configuration data 800 and data 805 collected from tools is stored in the database 875. The configuration data is comprised of information 810 concerning the equipment diagnostic monitor system 120 and of information 815 concerning the tool 102 shown in FIG. 2. The equipment diagnostic monitor system information 810 may be comprised of information concerning users and privileges 820, network information 825, and security information 830. The tool information 815 may be comprised of information 835 concerning tool types and serial numbers as well as log file information 840.

The data 805 collected from the tool 102 may be comprised of raw tool data 845, common and interpreted data 850, and tool-specific data 855. Raw tool data 845 is data collected directly from tests on the tool 102. Common and interpreted data 850 is comprised of summary tables of data collected from a plurality of tools 102. Tool specific data 855 is comprised of data such as the settings for a particular tool.

The present invention generally provides a more efficient system of equipment support and maintenance as well as early identification and assessment of a potential problem such that the problem can be quickly and efficiently addressed.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for accessing data remotely from a network, comprising:
    a local network interface device permitting data transfer between a local network and an intermediate network, the local network including at least one semiconductor processing tool and semiconductor processing tool monitoring equipment where the at least one semiconductor processing tool is assigned an IP address identifying the at least one semiconductor processing tool within the local network;
    a remote network interface device permitting data transfer between the intermediate network and a remote network; and a module located within the intermediate network, through which data transferring between the local network and the remote network passes, the module being configured to monitor and analyze the at least one semiconductor processing tool and to receive and process a first data from the remote network and send a different data to the local network based on the first data received from the remote network and to transmit a second data from the intermediate network to the remote network where the second data is related to a predetermined condition of a predetermined semiconductor processing tool identified by the module on the local network through a respective IP address, wherein the remote network receives the second data from the module with an IP address identifying the predetermined semiconductor processing tool within the local network associated with the second data being hidden from the remote network, the module being configured to monitor the predetermined semiconductor processing tool independent of input from the remote network;

wherein the local network is configured to receive and display a suggestion, at the predetermined semiconductor processing tool, from a user on the remote network regarding the operation of the predetermined semiconductor processing tool being monitored on the local network.

2. The system of claim 1, wherein the data transfer between each of the networks occurs via the Internet Protocol (IP), and wherein each network has its own unique IP address.

3. The system of claim 2, wherein the module hides the IP addresses of the remote network and the local network from each other.

4. The system of claim 1, wherein the module exchanges data with an equipment diagnostic monitor system located within the intermediate network, the equipment diagnostic monitoring system being configured to monitor a health of the equipment within the local network and wherein the equipment diagnostic monitor system has the function of monitoring at least one activity of the at least one semiconductor processing tool residing within the local network.

5. The system of claim 4, wherein the equipment diagnostic monitor system collects and analyzes data from tests performed on the at least one semiconductor processing tool.

6. The system of claim 1, wherein the intermediate network is configured to accept or reject information transmitted by the remote network depending on a set of predetermined criteria applied by the intermediate network.

7. The system of claim 1 wherein,
the intermediate network comprises an equipment diagnostic monitoring system configured to monitor and analyze the at least one semiconductor processing tool and having at least a monitoring module, an analysis module, an alerts module and an active transfer module; and
the remote network comprises remote control equipment configured to allow a user remote access to the at least one semiconductor processing tool.

8. A system for accessing a local network from a remote network through an intermediate network, comprising:
a local network interface card permitting data transfer between the local network and the intermediate network, the local network having a plurality of semiconductor processing tools that are identified within the local network by respective IP addresses and semiconductor processing tool monitoring equipment located within the local network;
a remote network interface card permitting data transfer between the remote network and the intermediate network, the remote network having a plurality of users located within the remote network; and
a module located within the intermediate network, the module being configured to receive and process data from at least one of the plurality of users of the remote network and send a different data to at least one of the plurality of semiconductor processing tools of the local network based on the data received from the remote network, the module being further configured to allow one of the plurality of users to select at least one equipment diagnostic monitor system from a plurality of equipment diagnostic monitoring systems; and
the plurality of equipment diagnostic monitor systems monitoring the health of the plurality of semiconductor processing tools within the local network independent of input from the remote network, and being located within the intermediate network, wherein the plurality of equipment diagnostic monitor systems monitor and analyze tests performed on the plurality of semiconductor processing tools residing within the local network;
the remote network, with an IP address identifying respective ones of the plurality of equipment within the local network being hidden from the remote network, and wherein the module is configured to convey both active requests and passive requests from a user on the remote network to at least one of the plurality of semiconductor processing tools of the local network where the conveyance of the active and passive requests depends at least partly on a status of an operation of the at least one of the plurality of semiconductor processing tools at a time of the active or passive request.

9. The system of claim 8, wherein the data transfer between each of the networks occurs via the Internet Protocol (IP).

10. The system of claim 9, wherein the module hides the IP addresses of the local network and the remote network from each other.

11. The system of claim 8, wherein the equipment diagnostic monitor system collects and analyzes data from the at least one activity of the at least one of the plurality of semiconductor processing tools.

12. The system of claim 8, wherein the user on the remote network may request that tests be performed on the at least one of the plurality of semiconductor processing tools, and may upload data to the remote network, from at least one test performed on the at least one of the plurality of semiconductor processing tools.

13. The system of claim 8, wherein the data is selectively passed between the local network and the remote network depending on a set of predetermined criteria applied by the intermediate network.

14. A data system, comprising:
a local network interface device enabling data transfer between a local network and an intermediate network, the local network including a plurality of semiconductor processing tools that are identified within the local network by respective IP addresses and semiconductor processing tool monitoring equipment;
a remote network interface device enabling data transfer between a remote network and the intermediate network; and
a plurality of equipment diagnostic monitor systems for monitoring a health of the plurality of semiconductor processing tools within the local network independent of input from the remote network, the equipment diagnostic monitoring system being located within the intermediate network, wherein the plurality of equipment diagnostic monitor systems monitors and analyzes at least one activity of at least one of the plurality of semiconductor processing tools in the local network;

wherein the intermediate network is configured to selectively receive and selectively process data from the remote network depending on a set of predetermined criteria applied by the intermediate network and send a different data to the local network based on the selectively processed data and to transmit a second data from the intermediate network to the remote network where the second data is related to a predetermined condition of predetermined semiconductor processing tools identified by the equipment diagnostic monitor system, wherein the intermediate network is configured to hide the respective IP addresses identifying the predetermined semiconductor processing tools on the local network such that the remote network receives the second data with the respective IP addresses identifying the predetermined semiconductor processing tools within the local network associated with the second data being hidden from the remote network.

15. The system of claim 14, further comprising a security module located within the intermediate network, through which data transferred between the local network and the remote network passes.

16. The system of claim 15, wherein data transfer between each of the networks occurs via an Internet Protocol (IP).

17. The system of claim 16, wherein the module hides an IP addresses of the local network and the remote network from each other.

18. The system of claim 14, wherein the equipment diagnostic monitor system collects and analyzes data from tests performed on the at least one of the plurality of semiconductor processing tools.

19. The system of claim 14, wherein the equipment diagnostic monitor system is configured to execute or ignore a request by the user on the remote network based on the set of predetermined criteria, wherein the user requests that tests be performed on the at least one of the plurality of semiconductor processing tools, and that data from previous tests performed on the at least one of the plurality of semiconductor processing tools be uploaded.

20. The system of claim 14, wherein the user on the remote network sends a suggestion regarding an operation of the at least one of the plurality of semiconductor processing tools being monitored to an entity managing the at least one of the plurality of semiconductor processing tools on the local network.

21. The system of claim 14, wherein the equipment diagnostic monitor system sends an alert to a predetermined entity when an analysis of data received from the at least one of the plurality of semiconductor processing tools indicates that the at least one of the plurality of semiconductor processing tools is operating outside of a predetermined performance range.

22. The system of claim 14 further comprising a remote control proxy server in the intermediate network that is between the local network and the remote network that prevents direct IP routing of a device in the local network that is being accessed by the remote network.

23. The system of claim 14 wherein the at least one of the plurality of semiconductor processing tools is coupled to the local network, the user being able to access the at least one of the plurality of semiconductor processing tools via the remote network.

24. The system of claim 14, wherein the equipment diagnostic monitor system controls tests performed by software within the at least one of the plurality of semiconductor processing tools, saves data from the tests and sends out alerts to a remote user via the remote network when the at least one of the plurality of semiconductor processing tools is operating outside a predetermined performance range.

25. The system of claim 14, wherein the equipment diagnostic monitor system effects access to the semiconductor tool by a remote user.

26. A data system for accessing remote equipment, comprising:

a first network interface device enabling data transfer between a local network and an intermediate network, the local network including at least one semiconductor processing tool that is identified within the local network by a respective IP address and semiconductor processing tool monitoring equipment;

a second network interface device enabling data transfer between a remote network and the intermediate network; and an equipment diagnostic monitor system configured to allow a user of the remote network to remotely control a diagnostic test performed on predetermined semiconductor processing tools for monitoring a health of the predetermined semiconductor processing tools with the respective IP address identifying respective ones of the predetermined semiconductor processing tools in the local network being hidden from the user of the remote network, the predetermined semiconductor processing tools being located in the local network, the equipment diagnostic monitoring system being located within the intermediate network, the equipment diagnostic monitoring system having at least a monitoring module, an analysis module, an alerts module and an active transfer module;

wherein the equipment diagnostic monitor system is configured to monitor at least one activity performed on the predetermined semiconductor processing tools in the local network independent of input from the remote network and the intermediate network is configured to receive and selectively process data from the remote network depending on a set of predetermined criteria applied by the intermediate network and send the processed data to the local network.

27. The system of claim 26, further comprising a security module located within the intermediate network, through which data transferred between the local network and the remote network passes.

28. The system of claim 27, wherein data transfer between each of the networks occurs via an Internet Protocol (IP).

29. The system of claim 28, wherein the security module hides an IP addresses of the local network and the remote network from each other.

30. The system of claim 26, wherein the equipment diagnostic monitor system is configured to collect and analyze data from at least one test performed on the predetermined semiconductor processing tools.

31. The system of claim 26, wherein the equipment diagnostic monitor system is configured to execute or ignore the request from the user on the remote network based on a set of predetermined criteria, wherein the user requests that tests be performed on the predetermined semiconductor processing tools, and that other data be uploaded from previous tests performed on the predetermined semiconductor processing tools.

32. The system of claim 26, wherein the equipment diagnostic monitor system is configured to send an alert to a predetermined entity when the analysis of the data indicates that the predetermined semiconductor processing tools are operating outside of a predetermined performance range.

33. The system of claim 26, further comprising an interface proxy located in the intermediate network, the interface proxy being configured to permit data transfer between the equipment diagnostic system and the remote network.

\* \* \* \* \*

UNITED STATES PATENT AND TRADEMARK OFFICE
CERTIFICATE OF CORRECTION

PATENT NO. : 8,510,476 B2  Page 1 of 1
APPLICATION NO. : 10/074411
DATED : August 13, 2013
INVENTOR(S) : Eastvold It is certified that error appears in the above-identified patent and that said Letters Patent is hereby corrected as shown below:

In the claims

Column 12, Claim 8, Line 23, before "the remote" insert --wherein the module is configured to convey test data related to the plurality of semiconductor processing tools, to users on-- therefor.

Signed and Sealed this
Tenth Day of November, 2015

Michelle K. Lee
*Director of the United States Patent and Trademark Office*